United States Patent Office 3,448,017
Patented June 3, 1969

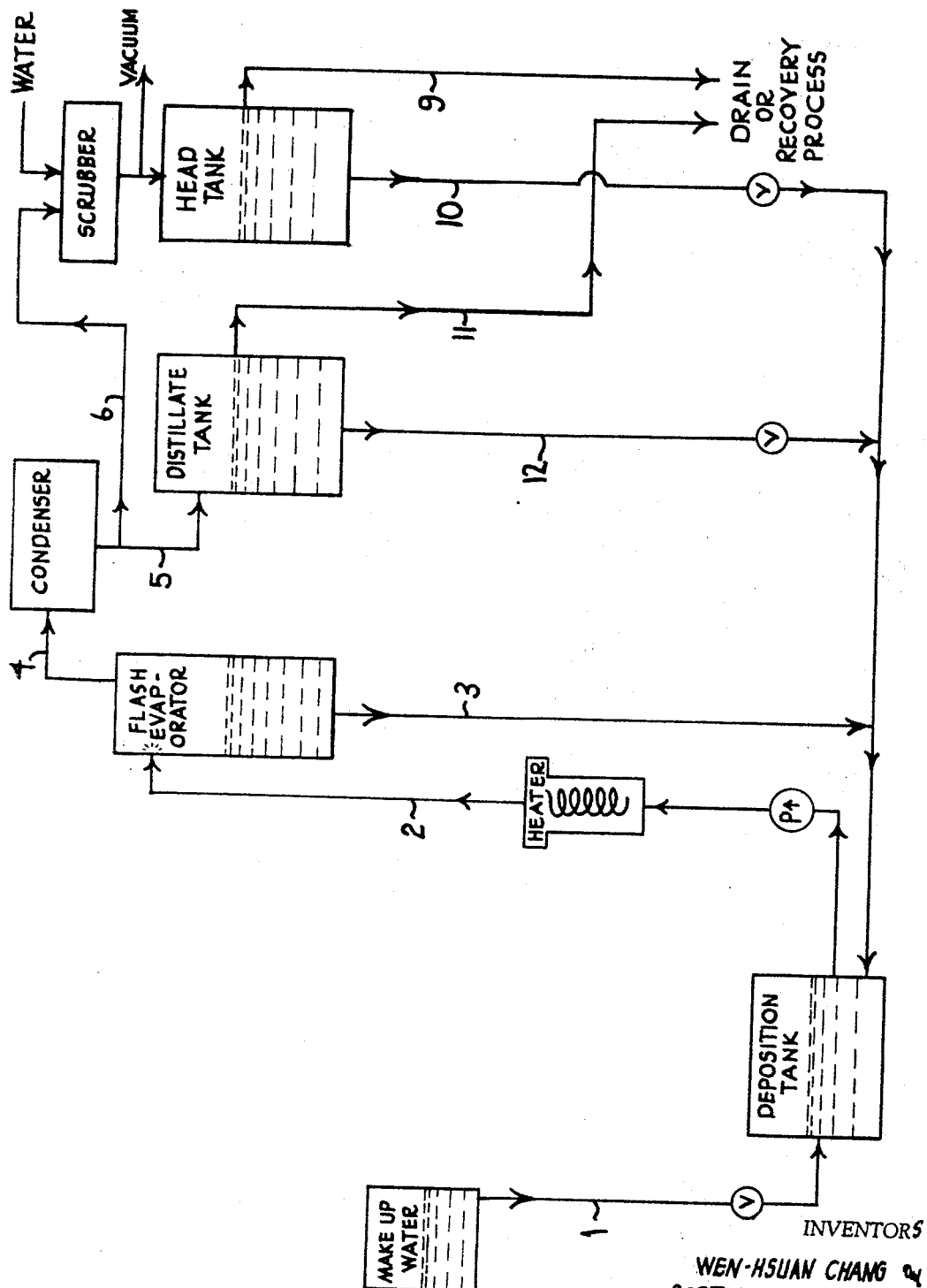

3,448,017
VAPOR-LIQUID SEPARATION METHOD FOR REMOVING EXCESS AMINE FROM ELECTRODEPOSITION BATH
Wen-Hsuan Chang and Rostyslaw Dowbenko, Gibsonia, Pa., assignors to PPG Industries Inc., Pittsburgh, Pa., a corporation of Pennsylvania
Filed Jan. 27, 1966, Ser. No. 523,397
Int. Cl. B01d 3/10, 3/06
U.S. Cl. 203—92          8 Claims

ABSTRACT OF THE DISCLOSURE

This invention relates to the use of vapor-liquid separation methods such as distillation techniques, especially at reduced pressure, to remove excess amines from electro-deposition bath compositions comprising a solubilized polycarboxylic acid resin.

---

This invention relates to a method of treating coating compositions useful for electrodepositing films. More particularly, it is a method in which vapor-liquid separation methods, such as evaporation and distillation techniques, are employed to remove undesirable constituents from the compositions without affecting their utility in electrodeposition processes.

Electrodeposition is a relatively new coating technique, which, although based on well-known principles, has only recently be come technically feasible through the development of electrodepositable compositions which have desired characteristics to meet the demand placed on a modern coating material. The coatings achieved have excellent properties for many applications and electrodeposition results in a coating which does not run or wash off during baking. Virtually any conductive substrate may be coated by electrodeposition. Cost commonly employed substrates include base metals such as iron, steel, copper, zinc, brass, tin, nickel, chromium and aluminum, as well as other metals and pretreated metals. Impregnated paper or other substances rendered conductive under the conditions employed may also be coated.

Coating compositions which are usable in this manner include those which contain a polycarboxylic acid resin vehicle. In order to render the vehicle useful in electrodeposition processes, it is necessary to solubilize or neutralize at least part of the acidic groups. The neutralization is accomplished by the reaction of the carboxylic acid groups with a base. Although inorganic bases such as metal hydroxides can be used for this purpose, it is preferred to employ organic bases, particularly ammonia or amines. Among the preferred class of neutralization bases are ammonia and any basic amine, including alkyl amine, cycloalkyl amine, unsaturated amines, aromatic amines, aryl amines, arlkyl amines, cyclic amines, diamines, as well as substituted amines. The amine employed may be a primary, secondary or tertiary amine.

In electrodeposition processes using coating compositions as described above, the aqueous bath containing the composition is placed in contact with an electrically conductive anode and an electrically conductive cathode. Upon passage of an electric current between the anode and the cathode while in contact with the coating composition, an adherent film is deposited upon the anode. The conditions used are not critical and can be varied widely. For example, the applied voltage may be as low as 1 volt or high as 500 volts or even higher, although usually being between about 50 volts and about 450 volts.

Although the coating compositions described above are quite satisfactory and produce electrodeposited coatings having excellent properties, it has been found that extended and continued electrodeposition from a bath comprising the aforesaid coating composition results in a lessened quality in the films produced therefrom. It has been found that because the process is a true electrodeposition method, the deposited species are anions from the solution, and the corresponding cations remain in solution in the bath. In a continuous operation, the level of these cations builds up. As a result, there is a subsequent deterioration in the quality of the deposited film and, in addition, the bath attains a higher conductivity which in turn requires additional current in order to deposit films of suitable thickness.

Since the deposited coating is made up of the polycarboxylic acid resin vehicle, the cations which build up in the bath are due to the neutralizing base; thus, in the case of products neutralized with amines, the cations which remain in the solution are ammonium ions, for example the diethyl ammonium ion wherein diethylamine is used as the neutralizing agent. The buildup in cations in the bath is manifested by an increase in the pH of the solution.

Heretofore, the art has suggested at least four methods of separating excess amine from an electrodeposition bath. These are: (1) circulating the bath through cation exchange resins; (2) use of an amine deficient feed stock which will scavenge surplus cations; (3) circulating the bath through a simple dialysis unit; and (4) concentrating the amine in an electrodialysis cell formed by surrounding the cathode with a semi-permeable membrane.

It has now been found, and this discovery is the basis of the present invention, that when the bath contains amine the pH can be reduced and cations can be removed from an aqueous composition comprising a solution of a coating composition described above which has been used in an electrodeposition process and thus contains an excess of cations, by causing the bath composition containing excess cations to be subjected to a vapor-liquid separation process. Distillation or evaporation occurs, thereby removing the excess amine.

Another unexpected result achieved by this method is that the vapor-liquid separation process removes dissolved carbon dioxide. Carbon dioxide from the air is absorbed by the bath and fixed, apparently in the form of an amine carbonate, which acts as a buffer, requiring more amine to raise the pH to any given value. It has been found that in many cases less amine is required to restore the original pH than the amount of amine removed.

The time and/or amount of distillation which occurs is controlled so as to maintain the pH of the coating composition not lower than about the amount of amine necessary to maintain the vehicle in emulsion or solution, generally a pH of at least 6.0 and for most electrodepositable compositions, usually higher. Usually the pH is maintained below about 8.5 or 9.0 and preferably no higher than about 10.0, although certain resins may operate successfully at a higher pH. If the pH drops appreciably below 6.0 (or some higher value depending on the resin), the coating composition usually becomes insoluble and the resinous components tend to drop out of solution.

The desired pH level, the increased amine level at which the bath is treated, the actual time of contact under separation conditions all vary with several factors, including a type of vapor-liquid separation employed, the nature of the vehicle, and whether a pigment composition is included, the types of pigment present, the concentration of the various components in the aqueous bath, and similar considerations. However, the pH can usually continuously be monitored during the treatment, either by withdrawing samples, or by automatic sensing and feedback, thus maintaining the desired level.

The evaporation or distillation of the amine may be accomplished in various manners. While, for several reasons, flash evaporation under vacuum may be the preferred method in a large-scale, continuous operation, control of the bath by removing the amine in the vapor phase may be accomplished by direct distillation, that is, heating at barometric or near barometric pressure or by other means of known vapor-liquid separation; by bubbling a gas through the bath composition; by use of a falling film or a spray; or the use of countercurrent flow of a gas through a column to assist in exposure of the paint, in order to remove excess amine. The gas employed in these various operations may be air or an inert gas; preferably an inert gas is used since most electrodeposition compositions are susceptible to oxidation. The process may likewise be conducted by merely forcing a stream of gas across the surface of the bath to cause evaporation of the excess amine. This is especially true with a bath that is operated at a relatively high temperature and the amine is highly volatile.

One added benefit from the use of the process of this invention is that the process may be employed in such a manner that excess heat generated during the coating process as well as excess amine, is removed. The heat is actually removed more efficiently than in the regular cooling of the paint by heat exchanging since vapor-liquid transfer is more efficient than liquid-liquid transfer.

The amines which can be removed by the process of this invention comprise any amine whose content in the vapor phase is higher than its concentration in the aqueous phase. Some indication of this characteristic is the simple vapor-liquid curves of a solution of the amine in water. Generally, any amine whose boiling point is lower than that of water, i.e., 100° C., can be successfully removed by the process of this invention, although the invention is not necessarily limited thereto since some higher-boiling amines have vapor characteristics which fall within the above-disclosed parameters, such as those which form azeotropes, boiling below 100° C. with water or ternary with water and a third liquid which may be present in the electrodeposition bath.

Examples of suitable amines include ammonia, lower alkyl amines such as methylamine, dimethylamine, trimethylamine, ethylamine, diethylamine, triethylamine, propylamine, dipropylamine, isopropylamine, diisopropylamine, butylamine, isobutylamine, methylethylamine, methylpropylamine, methylethylpropylamine, unsaturated amines, such as allyl, diallyl and triallyl amines, methyldiallyamine, heterocyclic amine such as pyrrolidine, piperidine, n-methylpyrrolidine, pyrrolines, and acetoxyethylamine, as well as other low-boiling amines used to solubilize electrodepositable compositions.

A number of electrodepositable resins are known and can be employed to provide the electrodepositable composition of this invention. Virtually any water-soluble, water-dispersible or water-emulisfiable polycarboxylic resinous material can be electrodeposited and, if film-forming, provides a coating which may be suitable for certain purposes. Any such electrodepositable is included among those which can be employed in the present invention, even though the coating obtained may not be entirely satisfactory for certain specialized uses.

The preferred resins which may be employed in the process invention comprise a reaction product or adduct of the drying oil or semi-drying oil fatty acid ester with a discarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed. Generally, drying oils are those oils which have an iodine value of above about 130, and the semi-drying oils are those which have an iodine value of about 90 to 130, as determined by method ASTM-D1467-57T. Examples of such esters include linseed oil, soya oil, safflower oil, perilla oil, tung oil, onticica oil, poppyseed oil, sunflower oil, tall oil, esters, walnut oil, dehydrated castor oil, herring oil, menhadan oil, sardine oil, and the like.

Also included among such esters are those in which the esters themselves are modified with other acids, including saturated, unsaturated or aromatic acids such as butyric acid, stearic acid, linoleic acid, phthalic acid, isophthalic acid, terephthalic acid or benzoic acid, or an anhydride of such acid. One inexpensive acid material which has been found to produce good results in many instances is rosin, which is composed of chiefly abietic acid and other resin acids. The acid modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using other polyols such as trimethylolpropane, pentaerythritol, sorbitol and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" as set forth herein are alkyd resins prepared utilizing semi-drying or drying oils; esters of epoxides with such fatty acids, including esters of diglycidyl ethers of ployhydric compounds as well as other mono-, di- and polyepoxides; semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the acid or anhydride with the fatty acid ester is not known with certainty, it is believed that the reaction takes place by addition of the unsaturated linkage of the acid or anhydride to the carbon chain of the oil. In the case of non-conjugated double bonds, such as are present in linseed oil, the reaction may take place with the methylene group adjacent the non-conjunction double bond. In the case of oils having conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300°

C. or higher, with the reaction generally being carried out between about 200° C. and about 250° C.

While the reaction products can be comprised solely of adducts of the fatty acid ester and the dicarboxylic acid or anhyride, in many instances it is desirable to incorporate into the reaction product another ethylenically unsaturated monomer. The use of such monomer often produces films and coatings which are harder and more resistant to abrasion and which may have other similar desirable characteristics. For this purpose, any ethylenically unsaturated monomer can be employed. Examples of such monomers include monoolefinic and diolefinic hydrocarbons such as styrene, alpho-methyl styrene, alpha-butyl styrene, vinyl toluene, butadiene-1,3, isoprene, and the like; halogenated monoolefinic and diolefinic hydrocarbons, such as alpha-chlorostyrene, alpha-bromostyrene, chlorobutadiene and similar compounds; esters of organic and inorganic acids; such as vinyl acetate, vinyl propionate, vinyl 2-chlorobenzoate, methyl acrylate, ethyl methacrylate, butyl methacrylate, heptyl acrylate, decyl methacrylate, methyl crotonate, isopropenyl acetate, vinyl alpha-bromopropionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate, and diethyl glutaconate; organic nitriles, such as acrylonitrile, methacrylonitrile, and ethacrylonitrile, and the like.

As is apparent from the above discussion and the examples set forth, which, of course, do not include all of the ethylenically unsaturated monomers which may be employed, any such monomer can be utilized. The preferred class of monomers can be described by the formula:

(I)

where $R_1$ and $R_2$ are hydrogen or alkyl, $R_4$ is hydrogen, alkyl or carboxyalkyl and $R_5$ is cyano, aryl, alkyl, alkenyl, aralkyl, alkaryl, alkoxycarbonyl or aryloxycarbonyl. The preferred compounds are styrene, substituted styrenes, alkyl acrylates, alkyl methacrylates, diolefins and acrylonitrile.

The reaction of the fatty acid ester, the acid or anhydride and any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and then this product is subsequently reacted with any ethylenically unsaturated monomer or monomers employed. For example, a reaction product of linseed oil, maleic anhydride and styrene is made by first reacting maleic anhydride with linseed oil and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. Generally speaking, between about 10 percent and about 45 percent by weight of the unsaturated acid or acid anhydride is reacted with from about 55 percent to about 90 percent by weight of fatty acid ester. In the presently preferred products, usually 15 percent to 30 percent of anhydride and 70 percent to 85 percent of oil ester are employed. If an ethylenically unsaturated monomer is incorporated in the reaction product, it is typically used in amounts between about 5 percent and about 35 percent by weight, based upon the total weight of acid or anhydride and ester, with between 10 percent and 25 percent being used in those products preferred at present. Thus, in most instances the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present.

The products produced in the above manner are comprised of polymeric chains of moderate length. The average molecular weight of the products to be used in electrodeposition should be low enough so that its flow characteristics at high solids are maintained, but high enough to provide adequate throwing power. The desirable molecular weight levels vary with the coating composition and conditions employed. Generally those products having molecular weights of up to 10,000 or somewhat higher have given the best results.

Neutralization of these products is accomplished by reaction of all or part of the dicarboxylic anhydride groups with an amine having the characteristic described above. Usually up to about half of such groups are neutralized in unesterified adducts; the partially esterified products are often neutralized to a greater extent, based on unesterified acid groups remaining.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom with the other two valences being linked to hydrogen or carbon atoms in the same or different organic radicals. Amido groups are formed, for example, when the reaction with the neutralizing base is carried out with a water solution of ammonia, a primary amine or a secondary amine, or when the product is reacted with such an amine in the absence of water.

Compositions within this general class are described in copending applications, Ser. No. 222,674, filed Sept. 10, 1962, now U.S. Patent 3,369,983, and 282,880, filed May 24, 1963, now U.S. Patent 3,369,983.

Another vehicle comprises the fatty acid ester, unsaturated acid or anhydride reaction products and any additional unsaturated modifying materials (as described above) which are further reacted with the polyol.

Essentially any polyol can be employed but diols are preferred. When higher polyols, such as trimethylolpropane, glycerol, pentaerythritol and the like are utilized, they are employed in small amounts, or in conjunction with the diol, or in the presence of a monohydric alcohol, and are used with adducts having a relatively low proportion of acidic component. The various diols that can be employed include, for example, ethylene glycol; 1,2-propylene glycol; 1,4-butanediol; 1,5-pentanediol; 2-methyl-2-n-propyl-1,3-propanediol, and similar higher or substituted alkylene glycols, containing up to about 20 carbon atoms or more. Glycol ethers may also be employed, such as diethylene glycol, triethylene glycol, poly(oxytetramethylene) glycols and the like, those having molecular weights of up to about 400 being most useful. Water-insoluble diols are often preferable, and especially desirable water-dispersed compositions for electrodeposition are obtained using 2,2-bis-(4-hydroxycyclohexyl) propane (which has given the best results), neopentyl glycol, 1,1′-isopropylidenebis(p-phenyleneoxy)di-2-propanol, and similar diols.

The proportions of polyol and ester-anhydride adduct that are employed depend upon various factors, but are in general limited only by the need to avoid gelation of the product. The total functionality of the reactants is a guide to determining the optimum proportions to be employed, and in most instances should not be greater than about 2. By total functionality is meant the total number of anhydride and hydroxyl groups divided by the total number of molecules of polyol and adduct. The numbers involved are, of course, average figures, and obviously many factors are taken into consideration in determining functionality, these being well-known in the art. When monomeric constituents are used, their functionality is relatively easily determined; but with resinous products such as the adducts herein, not only the proportion of anhydride in the adduct but also the bodying effect due to heating and similar considerations should be taken into account. In any event, one can easily determine whether any particular combination of reactants results in a gelled product, and as mentioned above, gelation can often be reversed by adding a monohydric alcohol.

In most instances, the reaction products herein are made from about 65 percent to about 98 percent of ester-anhydride adduct and about 2 percent to about 35 percent of a diol, these percentages being by weight. However, it will be understood that depending upon the molecular weights of the reactants, varying amounts within these ranges or outside these ranges are employed with particular reaction systems.

In many instances, only part of the anhydride groups of the adduct, e.g., about 10 percent, are reacted with the polyol. Of those anhydride groups reacted, it is preferred that only one of the carboxyl groups is esterified in instance. This is relatively easily accomplished because the half-ester of the dicarboxylic acid anhydride moieties present is preferentially obtained before the full ester begins to be formed. In addition, production of the full ester generally requires more stringent conditions, such as higher temperatures, even when an excess of hydroxyl groups are present. Thus, while it is not necessary that each anhydride form the half-ester and some of the dicarboxylic groups may be fully esterified, in actual practice the half-esters of the dicarboxylic acid moieties are usually obtained.

The reaction with the polyol is ordinarily carried out by admixing the initial reaction product of the fatty ester, the acid or anhydride, and any additional monomer with the polyol. The reaction at room temperature is quite slow, and thus it is preferred to heat the reaction mixture moderately, i.e., to about 80° C. or higher. The preferred maximum temperature is that at which the full ester begins to be formed, which varies with the particular polyol and which is in most cases about 180° C., but higher temperatures, up to about 300° C., can be used if desired, for example, when the number of hydroxyl groups present does not exceed the number of anhydride groups present.

When the reaction is carried out as described, the product contains a substantial part of the original acidity derived from the dicarboxylic acid or hydride; ordinarily the product should have an acid number of at least about 20. To provide a water-dispersed product, such as is used in electrodeposition processes, at least part of the remaining acidic groups are neutralized by reaction of the partially-esterified product with a base.

The polyol reaction products are more fully described in application Ser. No. 450,205, filed Apr. 22, 1965.

Another type of electrodepositable coating composition which gives desirable results are the water-dispersible coating compositions comprising at least partially neutralized interpolymers of hydroxyalkyl esters of unsaturated carboxylic acid, unsaturated carboxylic acids and at least one other ethylenically unsaturated monomer. These are employed in the composition along with an amine-aldehyde condensation product, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethylacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example up to about 5 carbon atoms in the hydroxyalkyl radical. Mono- or diesters of the dicarboxylic acids mentioned are included. Ordinarily, the acid and ester each comprise between about 1 percent of about 20 percent by weight of the interpolymer, with the remainder being made up of one or more other copolymerizable ethylenically unsaturated monomers. The most often used are alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent, and preferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanamine, or urea with formaldehyde, although other amine-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

Electrodeposition compositions comprising the above interpolymers and an amine-aldehyde resin are more fully described in copending application Ser. No. 368,394, filed May 18, 1964 now U.S. Patent 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl) melamine.

The alkyd-amine compositions are dispersed in water and they ordinarily contain from about 10 percent to about 50 percent by weight of amine resin based on the total resinous components.

Examples of compositions of this class are described in U.S. Patents Nos. 2,852,475, 2,852,476, and 2,853,459.

The electrodepositable coating compositions may contain a pigment composition. The pigment composition may be of any conventional type, comprising, for example, iron oxides, lead oxides, carbon black, titanium dioxide, talc, barium sulfate, strontium chromate, and the like, as well as combinations of these and similar pigments. Color pigments such as cadmium yellow, cadmium red, phthalocyanine blue, chromic yellow, toluidine red, hydrated iron oxide and the like may be included if desired. Better results with pigmented compositions are attained if the weight ratio of pigment solids to vehicle solids is not higher than about 1.5 to 1, and preferably not higher than about 1 to 1.

There may also be included in the coating composition, if desired, additives such as antioxidants, for example, orthoamyl phenol or cresol (the commercial mixture of isomeric cresols is satisfactory). It is found especially advantageous to include such antioxidants in coating compositions which are used in baths which may be exposed to atmospheric oxygen at elevated temperatures and with violent agitation over extended periods of time.

In formulating the coating composition, ordinary tap water may be employed. However, such water may contain a relatively high level of metals and cations; while not rendering the process inoperative, the use of water containing these cations may result in variations in the properties of the bath when used for electrodeposition. Thus, it is often desirable to utilize deionized water, i.e., water from which free ions have been removed as by passage through an ion exchange resin, in making up the coating compositions of the invention.

Other additives which may be included in the coating composition if desired include, for example, wetting agents such as petroleum sulfonates, sulfated fatty amides, esters of sodium isothionates, or alkylphenoxypolyoxyethylene alkanols, as well as driers such as the linoleates, the naphthenates, the octanates and the tallates of such metals as lead, cobalt, manganese, iron, copper and zirconium. Other additives which may be employed include antifoaming agents, suspending agents, bactericides and the like.

In electrodeposition processes employing the various coating compositions described above, an aqueous bath containing the coating composition is placed in contact with an electrically conductive anode and an electrically conductive cathode. The surface to be coated is employed as one of the electrodes. In the specific examples of the compositions described above, the surface to be coated is employed as the anode. Upon the passage of electric current between the anode and the cathode, while in contact with the bath containing the coating composition, an adherent film of the coating composition is deposited. The conditions under which the electrodeposition step herein is carried out are those conventionally used in electrodeposition of coatings. The applied voltage may be varied greatly and can be, for example, as low as 1 volt or as high as several thousand volts, although typically between 50 volts and 500 volts. The current density is usually between about 0.1 ampere and 15 amperes per square foot, and is high initially and tends to decrease during the electrodeposition of a single article.

The concentration of the non-volatile components (i.e., vehicle and any pigments and the like) in the aqueous bath is not critical and relatively high levels can be employed. However, it is ordinarily desirable to use as low a concentration as gives satisfactory results, and in the cases of the above-described compositions, aqueous compositions containing as little as 1 percent by weight of non-volatile solids can be employed, while those containing between 5 percent and 20 percent by weight are preferred.

The invention is further described in conjunction with the following examples which are considered illustrative rather than limiting. All parts and percentages in the examples and throughout the specification are by weight unless otherwise stated.

EXAMPLE I

A 50 gram sample of a 20 percent maleinized oil having a viscosity of 32,000 centipoises was solubilized with excess amine or amines as indicated below. To the resin was then added 500 grams of deionized water. The mixture was then vacuum distilled at about 30 millimeters of mercury at about 30–35° C. The amount of distillate was recorded, as well as the pH of the distilland. The distilland was replenished with the same volume of deionized ture is then sparged for one-half hour with inert gas to measure the amount of uncondensed vapors in the system).

TABLE I

1. Trimethylamine:

| | | | | | | |
|---|---|---|---|---|---|---|
| pH values | 9.9 | 8.6 | 8.2 | 8.09 | 7.7 | 7.75 |
| Ml. removal | 0 | 20 | 50 | 70 | 105 | 125 |
| Percent removal | 0 | 3.7 | 9.1 | 12.7 | 19.1 | 24.7 |

2. Triethylamine:

| | | | | | | | |
|---|---|---|---|---|---|---|---|
| pH values | 9.6 | 8.55 | 8.34 | 8.23 | 8.15 | 7.95 | 7.79 |
| Ml. removal | 0 | 20 | 45 | 65 | 95 | 160 | 195 |
| Percent removal | 0 | 3.7 | 8.2 | 11.8 | 17.3 | 29.1 | 35.4 |

3. Dimethylamine:

| | | | | | | |
|---|---|---|---|---|---|---|
| pH values | 11.1 | 10.4 | 9.4 | 9.05 | 8.8 | 8.65 |
| Ml. removal | 0 | 24 | 47 | 68 | 89 | 141 |
| Percent removal | 0 | 4.35 | 8.55 | 12.3 | 16.1 | 25.7 |

4. Diethylamine:

| | | | | | | |
|---|---|---|---|---|---|---|
| pH values | 9.15 | 8.8 | 8.55 | 8.55 | 8.55 | 8.25 |
| Ml. removal | 0 | 50 | 100 | 200 | 300 | 400 |
| Percent removal | 0 | 9.1 | 18.2 | 36.4 | 53.5 | 72.3 |

5. Ammonium hydroxide:

| | | | | | | | | |
|---|---|---|---|---|---|---|---|---|
| pH values | 10.4 | 9.65 | 9.0 | 8.35 | 8.25 | 8.1 | 8.1 | 8.05 |
| Ml. removal | 0 | 22 | 41 | 62 | 81 | 100 | 123 | 173 |
| Percent removal | 0 | 4.0 | 7.47 | 11.5 | 14.7 | 18.2 | 22.4 | 31.4 |

6. N,N-dimethyl-B-hydroxyethylamine:

| | | | | |
|---|---|---|---|---|
| pH values | 9.36 | 9.37 | 9.1 | 9.13 |
| Ml. removal | 0 | 28 | 98 | 200 |
| Percent removal | 0 | 5.1 | 17.8 | 31.4 |

7. Morpholine:

| | First Try | | Second Try | | |
|---|---|---|---|---|---|
| pH values | 8.82 | 8.82 | 9.20 | 9.22 | 9.20 |
| Ml. removal | 0 | 32 | 0 | 32 | 100 |
| Percent removal | 0 | 5.8 | 0 | 5.8 | 18.2 |

8. The maleinized oil was neutralized with 5 percent diethylamine, the remainder of amine added was trimethylene:

| | | | | | | |
|---|---|---|---|---|---|---|
| pH values | 10.4 | 8.48 | 7.95 | 9.80 | 7.64 | 7.60 |
| Ml. removal | 0 | 27 | 65 | 92 | 137 | 188 |
| Percent removal | 0 | 4.9 | 11.8 | 16.7 | 24.9 | 34.2 |

9. The maleinized oil was neutralized with 5 percent diethylamine and the remainder of amine added was ammonium hydroxide and then water:

| | | | | | | |
|---|---|---|---|---|---|---|
| pH values | 10.5 | 10.0 | 9.2 | 8.62 | 8.20 | 7.95 |
| Ml. removal | 0 | 10 | 35 | 48 | 90 | 180 |
| Percent removal | 0 | 1.8 | 6.4 | 8.7 | 16.3 | 32.7 |

EXAMPLE II

Pigmented electrodeposition composition was prepared as follows:

Reaction 1

784 parts maleic anhydride and 2,280 parts of tall oil fatty acid were charged to a reactor equipped with agitator, thermometer, inert gas inlet and reflux condenser. The air in the reactor was displaced by an inert gas blanket and the reaction mixture was heated slowly to 225° C. in about 2 hours and to 260° C. in another hour. The reaction was held at 260° C. for 3 hours and then cooled. Reaction mixture had a viscosity of 5,000 centipoises and an acid value of 255 measured in alcoholic KOH.

Reaction 2

1,850 parts of an epoxy resin which is the reaction product of epichlorohydrin and para, para'-isopropylidenediphenol having a Durans melting point of between 95° C. and 105° C., an epoxy equivalent between 870 and 1,025, having an average molecular weight of 1,400 and having a Gardner viscosity at 25° C., of Q to U, measured in 40 percent butyl carbitol (Epon 1004), 1,425 parts of tall oil fatty acid, 75 parts xylene were charged into a reactor equipped with stirrer, thermometer, inert gas inlet, reflux condenser and water trap. The reaction was heated with stirring in a slow inert gas sparge to 250° C. and held to an acid value of 5.0. This takes approximately 4.5 hours after reaching 200° C. The mixture is then sparged for one-half hour with inert gas to remove xylene and cooled to 150° C.

Reaction 3

To the above adduct (Reaction 2) was added the Reaction 1 adduct and the mixture was reheated to 145° C. and held for an hour. The resulting mixture was then thinned with 420 grams of 4-methoxy-4-methylpentanone-2, the final product having the viscosity of 33,000 centipoises and an acid value measured in alcoholic KOH of 36.0.

The pigment paste was formed by dissolving 3.25 parts of nonylphenol poly(epoxy)phosphate esters, as a dispersing agent, and 49.30 parts of water and then adding 5.11 parts of strontium chromate, 41 parts china clay and 56.3 parts red iron oxide. The above mixture was ground in a steel ball mill to a Hegman reading of 6½. There was then added 12.8 parts water and grinding continued for a half hour and then drained with agitation. The above paste was added to 12.20 parts of tetrakis(methoxy metha)benzoguanamine, 3.8 parts of 4-methoxy-4-methylpentanone-2, 271 parts of the reaction product of Reaction 3 (above), 2.44 parts cresylic acid, 21.2 parts of triethylamine, and 396.1 parts of deionized water. The above is slowly reduced to 8 percent solids by the addition of deionized water and the pH adjusted to between 9.0 and 9.5. The above composition at 10 percent solids with a pH of 9.2 was added to 1.5 grams triethylamine to 700 grams of the above. This product is vacuum distilled. The results are shown on the following table:

TABLE II

| pH values | 9.9 | 9.6 | 9.08 | 8.72 | 8.6 |
|---|---|---|---|---|---|
| Ml. removal | 0 | 10 | 30 | 50 | 60 |
| Percent removal | 0 | 1.43 | 4.28 | 7.15 | 8.57 |

One example of the manner in which the process of this invention may be carried out is further elucidated by reference to the drawing, FIGURE I. The electrodepositable composition is withdrawn through line 2, passing through a heater and into a flash evaporator maintained at a reduced pressure by a vacuum source. The distilland is returned to the bath through line 3. The distillate containing the amine is passed through line 4 to a condenser and a condensate is passed through line 5 to a storage container from which amine may be returned to the electrodeposition bath through line 12 in order to adjust the pH of the water or may be withdrawn through line 11 to be discarded or passed to an amine recovery process. Any uncondensed vapors leaving the condenser are passed through line 6 to a scrubber which removes any remaining amine. Again, the output of the scrubber is passed into a head tank from which it may be returned to the bath through line 10 or may be discarded or processed through line 9. Preferably, in order to maintain the percentage solids of the water at an even level make-up water may be added through line 1. It should be noted that, in order to provide a liquid seal for the vacuum system and to provide a working head for the return and flow of the various streams, the liquid level in the evaporator, the distillate tank and any head tanks be elevated at least about 34 feet above the surface of the liquid level of the electrodeposition bath. Obviously, alternatively value means and pumping means may be employed to achieve the same result without elevating the system.

According to the provisions of the patent statutes, there are described above the invention and what are now considered to be its best embodiments; however, within the scope of the appended claims, it is to be understood that the invention can be practiced otherwise than specifically described.

What is claimed is:

1. A method of treating an aqueous electrodepositable composition comprising a polycarboxylic acid resin, at least partially neutralized with an amine which boils below about 100° C. or an amine which forms an azeotrope with water which boils below about 100° C., said composition having been used in an electrodeposition process, which comprises subjecting at least a portion of said composition to a vapor-liquid separation process, vaporizing a portion of said amine, thereby lowering the pH of said composition.

2. A method as in claim 1 wherein sufficient water is added to the electrodepositable composition to replace the vapors removed, in order to maintain the percentage solids of the electrodepositable composition at a relatively constant level.

3. A method as in claim 1 wherein the amine boils below about 100° C.

4. A method as in claim 3 wherein sufficient water is added to the electrodepositable composition to replace the vapors removed, in order to maintain the percentage solids of the electrodepositable composition at a relatively constant level.

5. A method of treating an aqueous electrodepositable composition comprising a polycarboxylic acid resin, at least partially neutralized with an amine which boils before about 100° C. or an amine which forms an azeotrope with water which boils below about 100° C., said composition having been used in an electrodeposition process which comprises subjecting at least a portion of said composition to distillation at a reduced pressure, distilling a portion of said amine, thereby lowering the pH of said composition.

6. A method as in claim 5 wherein sufficient water is added to the electrodepositable composition to replace the distillate removed, in order to maintain the percentage solids of the electrodepositable composition at a relatively constant level.

7. A method as in claim 5 wherein the amine boils below about 100° C.

8. A method as in claim 7 wherein sufficient water is added to the electrodepositable composition to replace the distillate removed, in order to maintain the percentage solids of the electrodepositable composition at a relatively constant level.

References Cited

UNITED STATES PATENTS

| 2,146,201 | 2/1939 | Coltof | 203—88 |
|---|---|---|---|
| 2,357,412 | 9/1944 | Levesque | 203—59 |
| 2,452,460 | 10/1948 | Hansley | 203—59 |
| 2,800,447 | 7/1957 | Graham | 204—181 |
| 2,936,267 | 5/1960 | Fernholz et al. | 203—91 |
| 3,304,250 | 2/1967 | Gilchrist | 204—181 |
| 3,364,162 | 1/1968 | Huggard | 204—181 |

HOWARD S. WILLIAMS, *Primary Examiner.*

E. ZAGARELLA, JR., *Assistant Examiner.*

U.S. Cl. X.R.

203—88, 96; 204—181